United States Patent [19]

Huetsch

[11] Patent Number: 4,685,861
[45] Date of Patent: Aug. 11, 1987

[54] CONTINUOUS SHAFT-DRIVEN INDUSTRIAL ROBOT

[75] Inventor: Larry Huetsch, Rockford, Ill.

[73] Assignee: Michael Madock, River Forest, Ill.

[21] Appl. No.: 666,498

[22] Filed: Oct. 30, 1984

[51] Int. Cl.[4] .............................................. B66C 1/00
[52] U.S. Cl. ..................................... 414/729; 901/15; 901/25; 901/26; 74/664; 192/20
[58] Field of Search ............... 414/680, 729, 730, 735; 901/15, 19, 23–26, 27, 28, 50; 74/665 F, 665 H, 665 GA, 665 GB, 66 A; 192/48.8, 48.9, 20, DIG. 2

[56] References Cited

U.S. PATENT DOCUMENTS

| 2,765,930 | 10/1956 | Greer et al. |
| 3,051,328 | 8/1962 | Brown et al. |
| 3,065,864 | 11/1962 | Coffman |
| 3,219,200 | 11/1965 | Ainsworth |
| 3,252,553 | 5/1966 | Peterson |
| 3,284,964 | 11/1966 | Saito |
| 3,315,542 | 4/1967 | Fortin et al. |
| 3,414,137 | 12/1968 | Fortin |
| 3,712,481 | 1/1973 | Harwood |
| 3,826,383 | 7/1974 | Richter |
| 3,985,238 | 10/1976 | Nakura et al. |
| 4,107,948 | 8/1978 | Molaug |
| 4,160,508 | 7/1979 | Salisbury, Jr. |
| 4,186,611 | 4/1980 | McKnight |
| 4,353,677 | 10/1982 | Susnjara et al. |
| 4,365,928 | 12/1982 | Baily |
| 4,476,743 | 10/1984 | Magin ............................ 192/48.9 X |
| 4,502,347 | 3/1985 | Norris et al. ................. 74/665 F X |
| 4,531,884 | 7/1985 | Russell ............................. 901/15 X |

FOREIGN PATENT DOCUMENTS 0073463 6/1977 Japan ..................................... 901/26

OTHER PUBLICATIONS

"The Robot and The Egg", by Dick Pothier of Knight-Ridder Newspapers, printed in the Chicago Tribune, Sunday, Aug. 7, 1983.

Primary Examiner—Joseph E. Valenza
Assistant Examiner—Lyle Kimms
Attorney, Agent, or Firm—Allegretti, Newitt, Witcoff & McAndrews, Ltd.

[57] ABSTRACT

An industrial robot has a base and the mechanical links of a shoulder, arm and hand joined in series with a waist joint, shoulder joint, wrist roll joint and wrist pivot joint. A clutch mechanism is associated with each joint, and continuously spinning shafting extends through all the links and joints. The clutch mechanisms each take power upon electronic command from the shafting to power the joints and move the links relative to each other.

26 Claims, 13 Drawing Figures

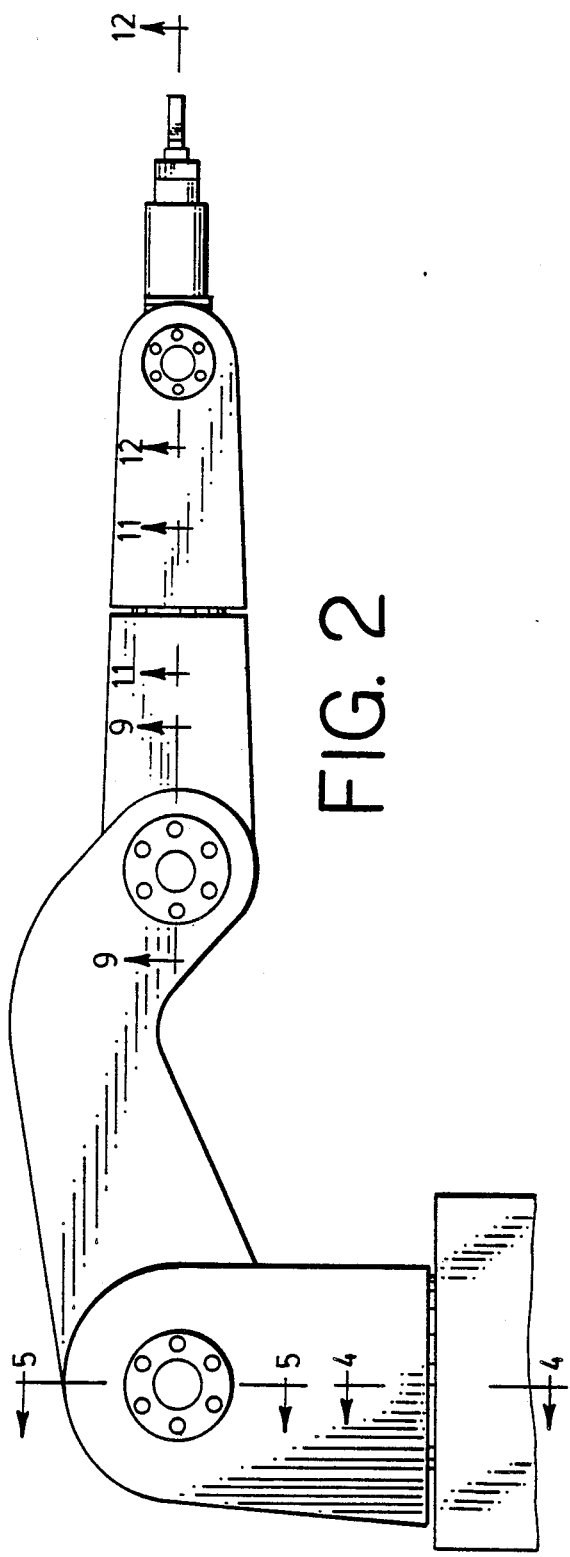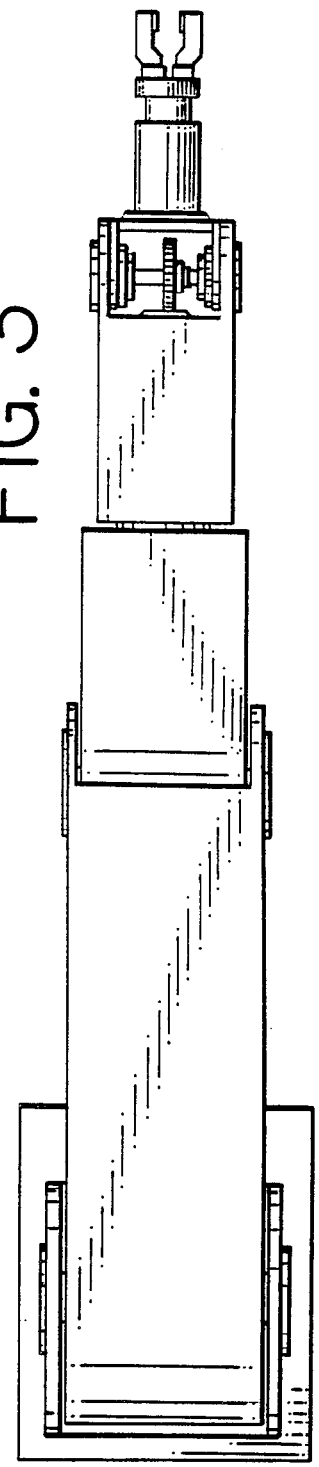

CONTINUOUS SHAFT-DRIVEN INDUSTRIAL ROBOT

BACKGROUND OF THE INVENTION

This invention relates to industrial robots, and more particularly to joint drive systems for such robots.

Industrial robots have become commonplace in the manufacture of automobiles and elsewhere. The robots typically take the shape of a massive arm, modeled after the human arm, with wrist, elbow and shoulder joints. Often a base is included which includes a waist joint for rotation of the arm about a vertical axis. The robots are typically computer controlled, and include a prime mover such as an electric motor for each joint. The robots are successful, but also expensive, complex, difficult to control, and difficult to service.

SUMMARY OF THE INVENTION

An object of the inventor in making this invention was to provide an industrial robot substantially less expensive, less complex, and less difficult to control and service than prior industrial robots, without substantial loss of load and work capacities, or precision and speed of movement.

In a principal aspect, then, the invention is an industrial robot comprising, first, a plurality of mechanical links including pivot connections which are pivotably connected to each other. A means is provided for driving the mechanical links relative to each other. The driving means is supported by the mechanical links. The driving means includes a continuously operating, mechanical power transmitting means, and a plurality of intermittently operating, mechanical power take off means. Each power take off means intermittently takes power upon command for the power transmitting means to drive one of the mechanical links relative to another about a pivot connection.

These and other objects, aspects and advantages of the invention are more fully set forth in the detailed description of the preferred embodiment, which follows a brief description of the accompanying drawing.

BRIEF DESCRIPTION OF THE DRAWING

The accompanying drawing includes thirteen figures or FIGS. as follows:

FIG. 2 is an elevation view of the preferred embodiment;

FIG. 3 is a top plan view of the preferred embodiment;

DETAILED DESCRIPTION OF THE PREFERRED EMBODIMENT

Figure 1:
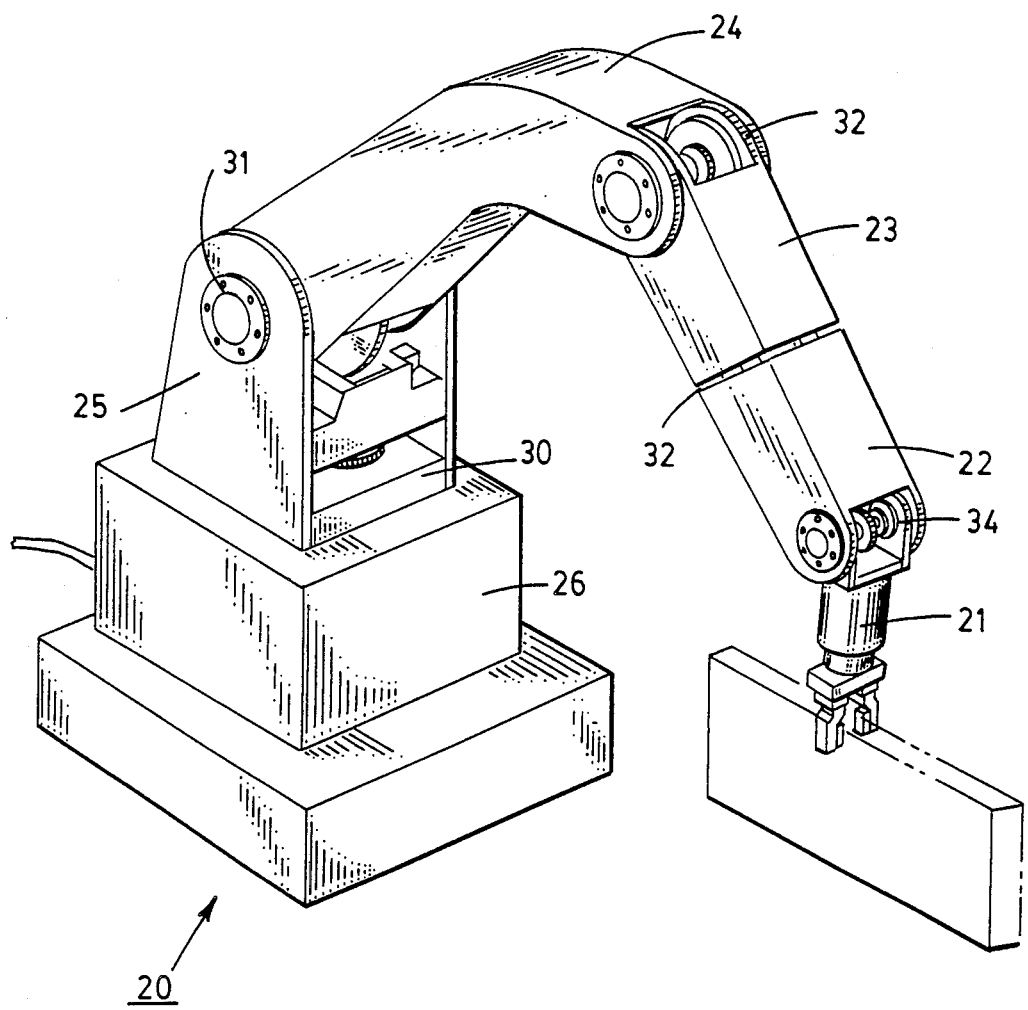
FIG. 1 is a general perspective view of the preferred embodiment of the invention.

Referring to FIG. 1, the preferred embodiment of the invention is an industrial robot 20. As typical, the robot 20 has the configuration of a massive human arm. A hand or clamp 21 is joined to a wrist 22, which is joined to a forearm 23. The forearm 23 is joined to an upper arm 24. The upper arm 24 is joined to a shoulder 25, which is mounted atop a base 26. The robot 20 is capable of movement about a waist joint 30, a shoulder joint 31, an elbow joint 32, a wrist roll joint 33, and a wrist pivot joint 34.

The clamp 21, wrist 22, forearm 23, upper arm 24 and shoulder 25 constitute a plurality of mechanical links of the robot 20. The joints 30-34 constitute a plurality of pivot connections which are included with the mechanical links, for pivotably connecting the links relative to each other. Thus, the robot 20 is adapted for pivoting movement of the plurality of mechanical links relative to each other about the plurality of pivoting joints, as are the bones of a human arm. The robot thereby has a skeleton adapted for lifting and transporting objects, and performing a variety of other useful tasks.

Movement of the robot skeleton is accomplished by a unique means for driving the mechanicl links 21-25 relative to each other and to the base 26. As will be described in detail, this unique driving means includes a continuously operating, mechanical power transmitting means and a plurality of intermittently operating, mechanical power take off means. The transmitting means extends from the base of the robot through the links to the wrist joint 34. Each power take off means intermittently takes power, upon command, from the power transmitting means. Each power take off means is associated with a pivot joint, and each joint has an individual power take off means. The power which each take off means takes upon command is employed to drive a mechanical link relative to another mechanical link about the pivot joint with which the take off means is associated.

Figure 9:
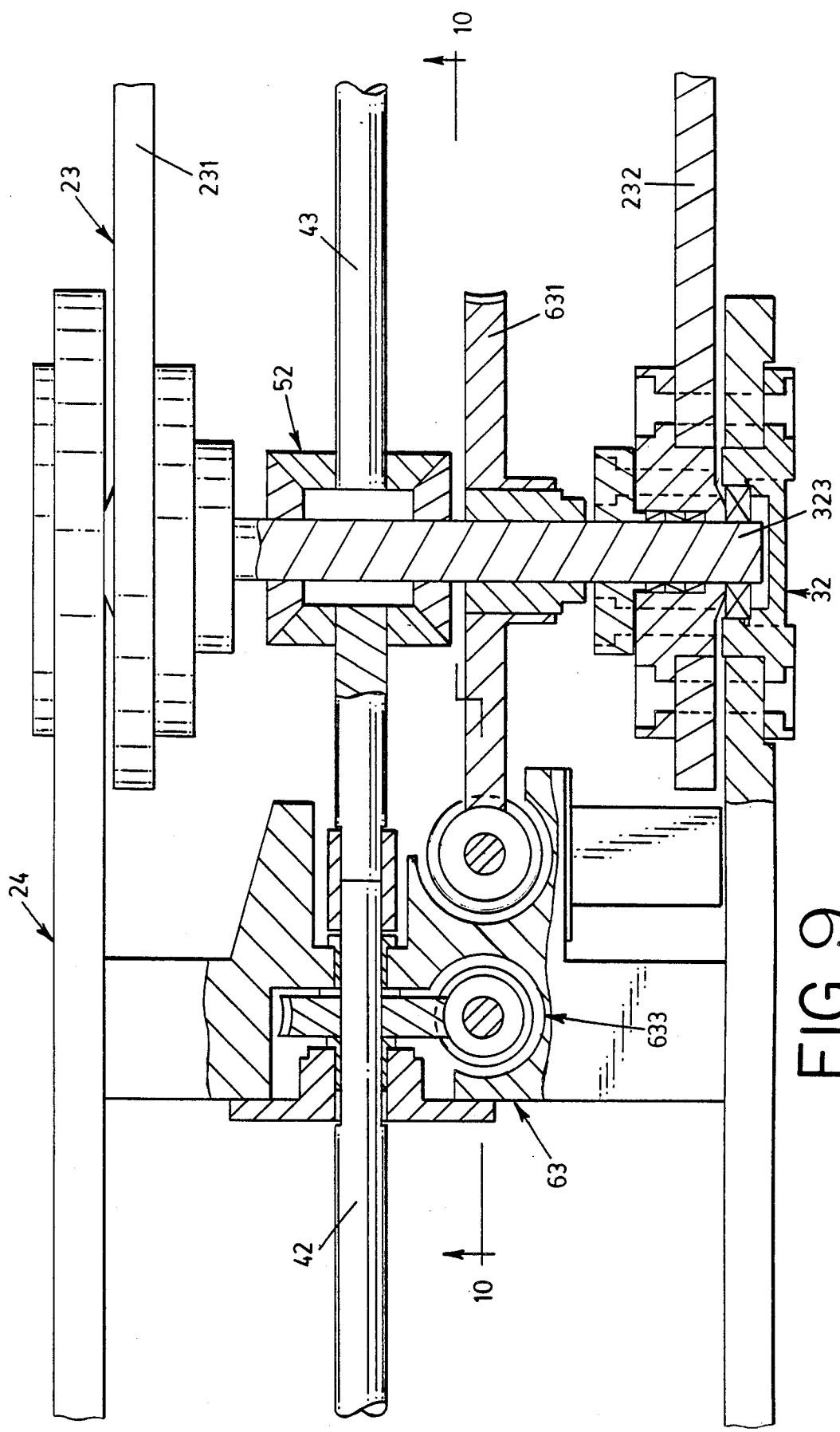
FIG. 9 is a cross-sectional view of the elbow of the preferred embodiment taken along line 9—9 of FIG. 2.
Figure 10:
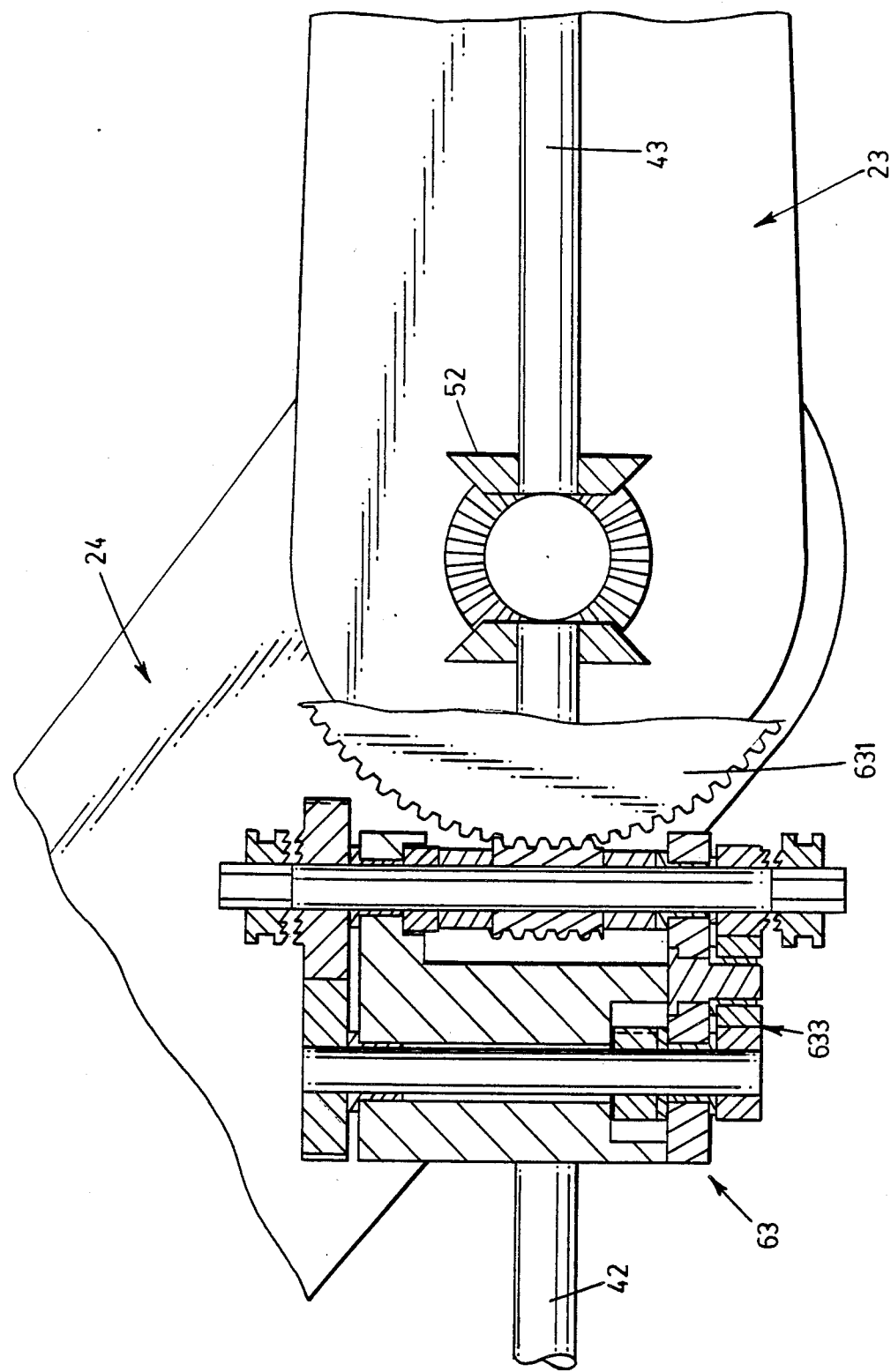
FIG. 10 is a cross-sectional view of the elbow of the preferred embodiment taken along line 10—10 of FIG. 9.
Figure 11:
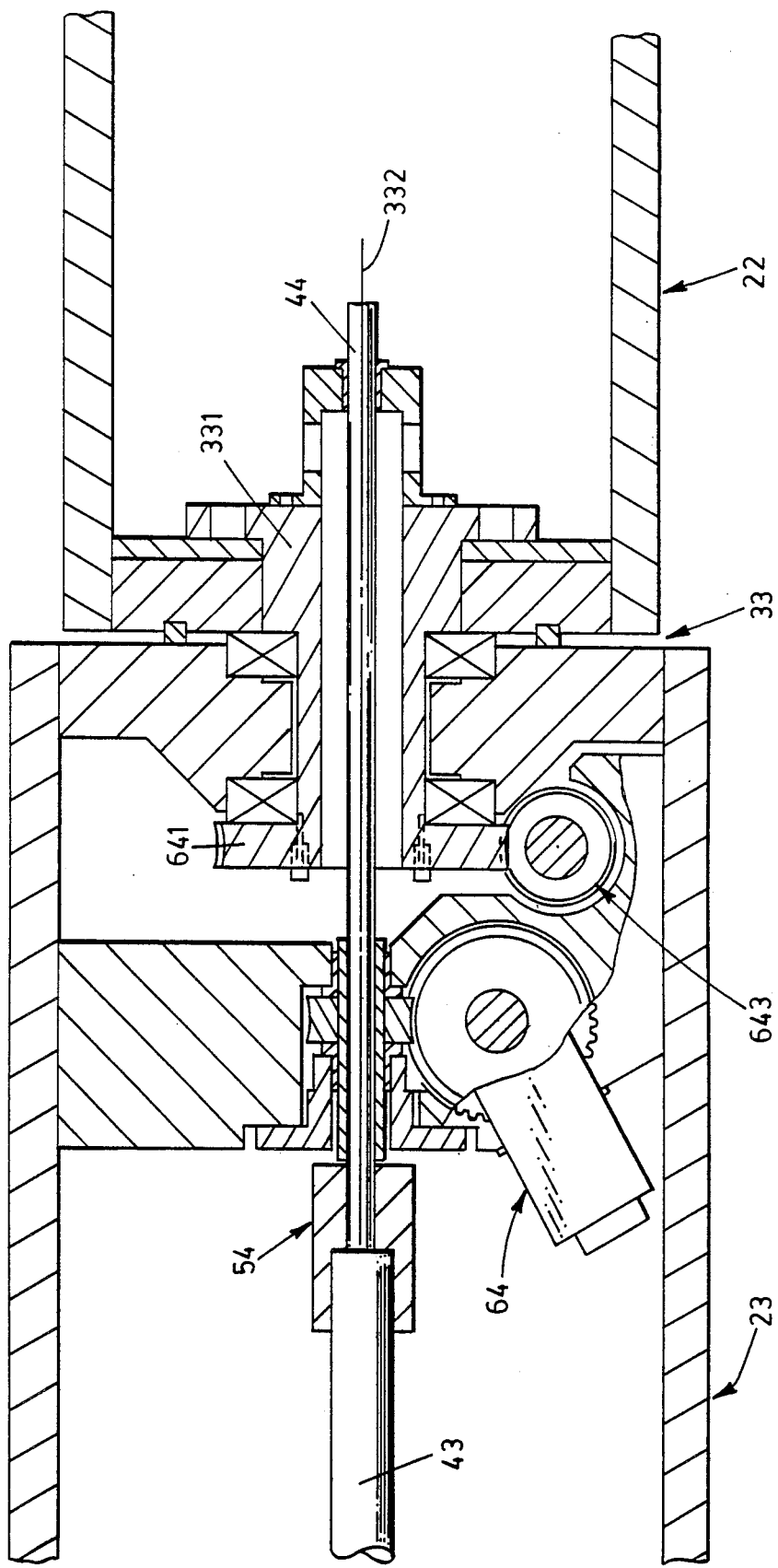
FIG. 11 is a cross-section view of a first portion of the wrist of the preferred embodiment taken along line 11—11 of FIG. 2.
Figure 12:
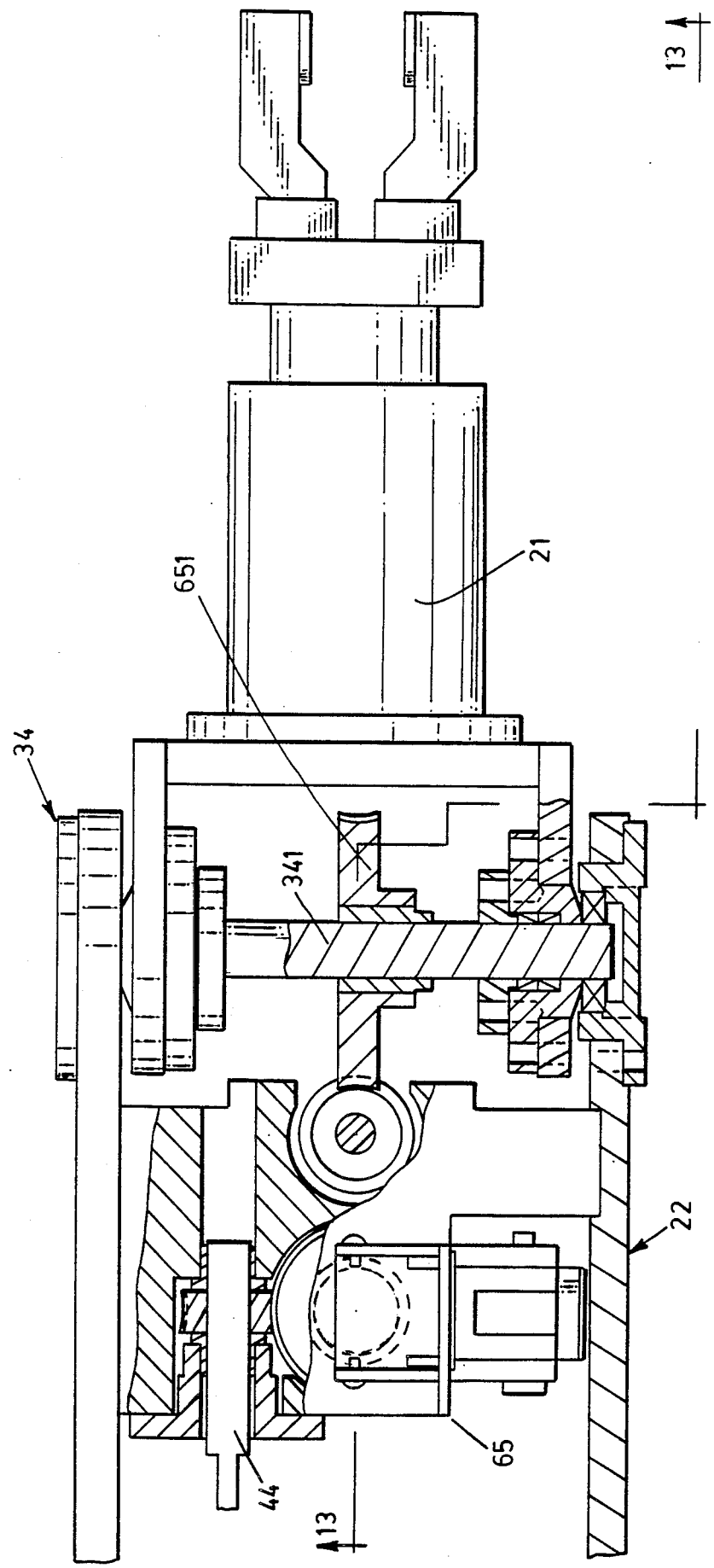
FIG. 12 is a first cross-sectional view of a second portion of the wrist pivot of the preferred embodiment taken along line 12—12 in FIG. 2.

The continuously operating, mechanical power transmitting means comprises continuously spinning shaft means. Referring briefly to each of FIGS. 4-6 and 9-12 in progression, the shaft means includes a plurality of shafts such as shafts 41 (FIGS. 4-6), 42 (FIGS. 6, 9 and 10), 43 (FIGS. 9-11) and 44 (FIGS. 11-12). The power transmitting means also comprises a plurality of universal joints such as universal joints 51 (FIGS. 5-6) and 52 (FIGS. 9-10), and direct joint 54 (FIG. 11). The universal joints and the joint 54 each join two of the power transmitting shafts 41-44 for continuous power transmission through all the shafts to the wrist. Power is transmitted through the full range of positions of the mechanical links relative to each other.

Figure 13:
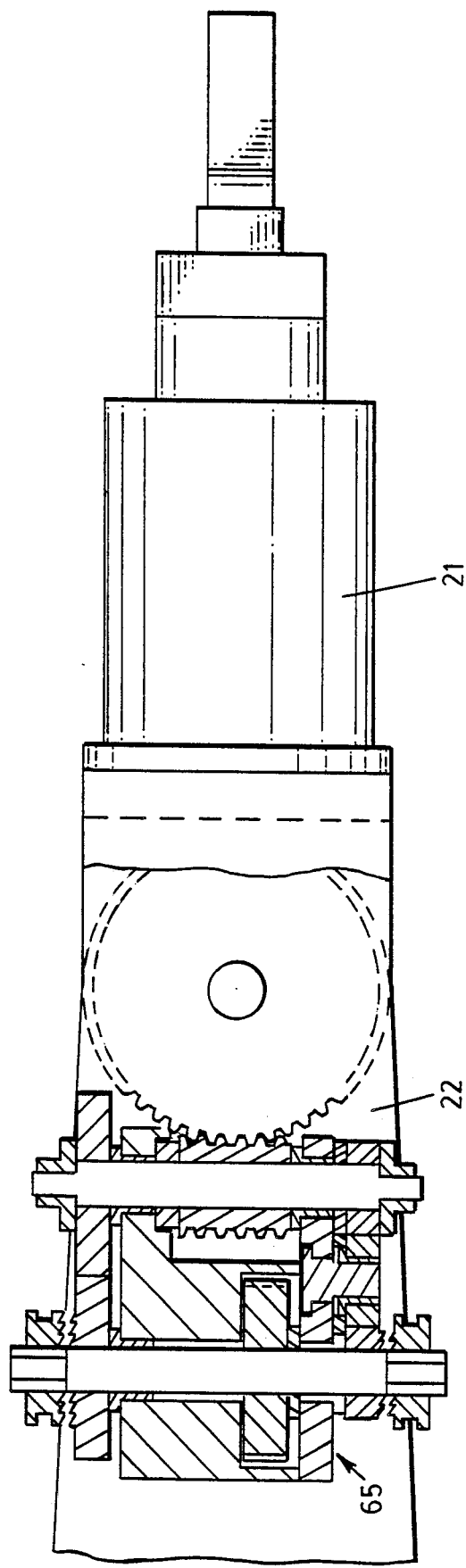
FIG. 13 is a second cross-sectional view of a second portion of the wrist of the preferred embodiment taken along line 13—13 in FIG. 12.

Referring to FIGS. 4-7 and 9-13 in progression, the power take off means comprises a plurality of electron-mechanical clutch mechanisms, such as mechanisms 61 (FIG. 4), 62 (FIGS. 5-6), 63 (FIGS. 9-10), 64 (FIG. 11) and 65 (FIGS. 12-13). Each clutch mechanism 61-65 responds to a computergenerated control signal to intermittently take power from an adjacent, spinning shaft, for driving one mechanical link about another. Activation of a clutch mechanism results in link movement about a joint for the duration of activation. As should be apreciated, complex movement of the robot arm 20 is caused by simultaneous and/or serial activation of the clutch mechanisms, as desired.

Figure 4:
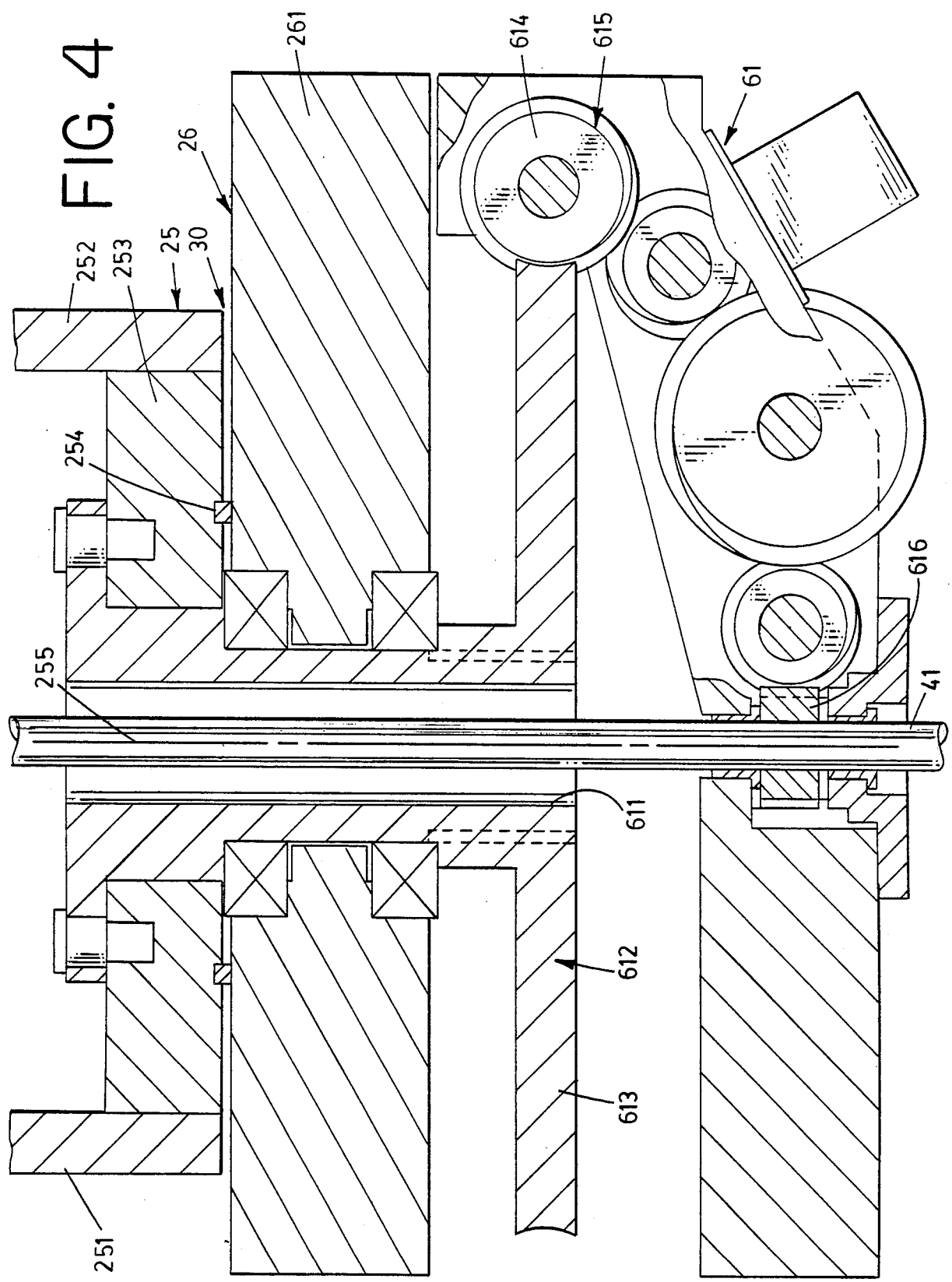
FIG. 4 is a cross-sectional view of the waist of the preferred embodiment taken along line 4—4 in FIG. 2.
Figure 5:
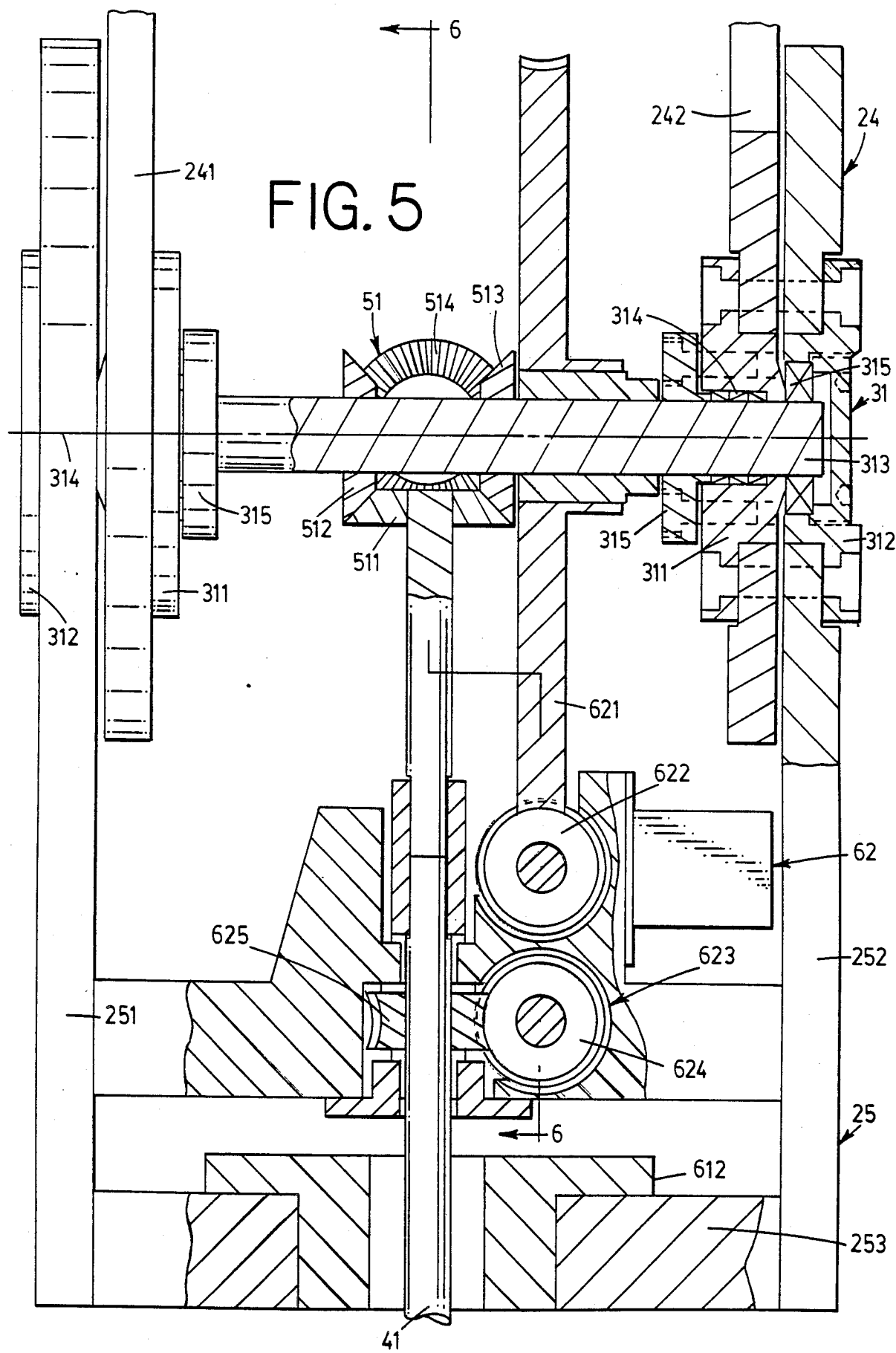
FIG. 5 is a cross-sectional view of the shoulder of the preferred embodiment taken along line 5—5 in FIG. 2.

Referring now to FIGS. 4 and 5 only, the shoulder link 25 includes a pair of laterally spaced posts 251, 252 fixed together atop a platform 253. Members 251, 252, 253, as well as all structural members of all links 21-26, are formed of steel or other suitable rigid material.

The platform 253, and thereby the posts 251, 252, are bearing mounted on the base 26. A bearing 254 (FIG. 4) supports the platform 253 atop a plate 261 (FIG. 4) of the base 26. The shoulder 25 is thereby mounted for pivotable movement atop the base 26 about a vertical axis 255.

Referring exclusively to FIG. 4, the shaft 41 extends from within the base 26 into the shoulder 25. The shaft 41 is centered upon the pivotal axis of the shoulder 25, and is driven from below by a prime mover (not shown) within the base 26. The prime mover is conventional, and is preferably a single, variable torque motor. During periods of use of the robot arm 20, the shaft 41 is constantly driven, at a constant speed of rotation.

The shaft 41 extends through the clutch mechanism 61 and the plate 261. In the area of the plate 261, the shaft 41 passes without physical contact through a vertical passage 611 defined in the center of a clutch mechanism drive member 612. The member 612 is fastened to the shoulder platform 253 and bearing mounted on the plate 261. A driven gear 613 of the member 612 is engaged by a clutch drive gear 614. A clutch gear drive train 615 including the drive gear 614 and a power take off gear 616 intermittently drives the member 612.

As stated previously, the clutch mechanism 61 intermittently takes power from the shaft 41 for driving the member 612, and thereby the shoulder 25 about the waist joint 30. For this purpose, the power take off gear 616 is fixed on the shaft 41. The gear 616 spins whenever shaft 41 spins. Clutch mechanism 61 is further described below.

Figure 6:
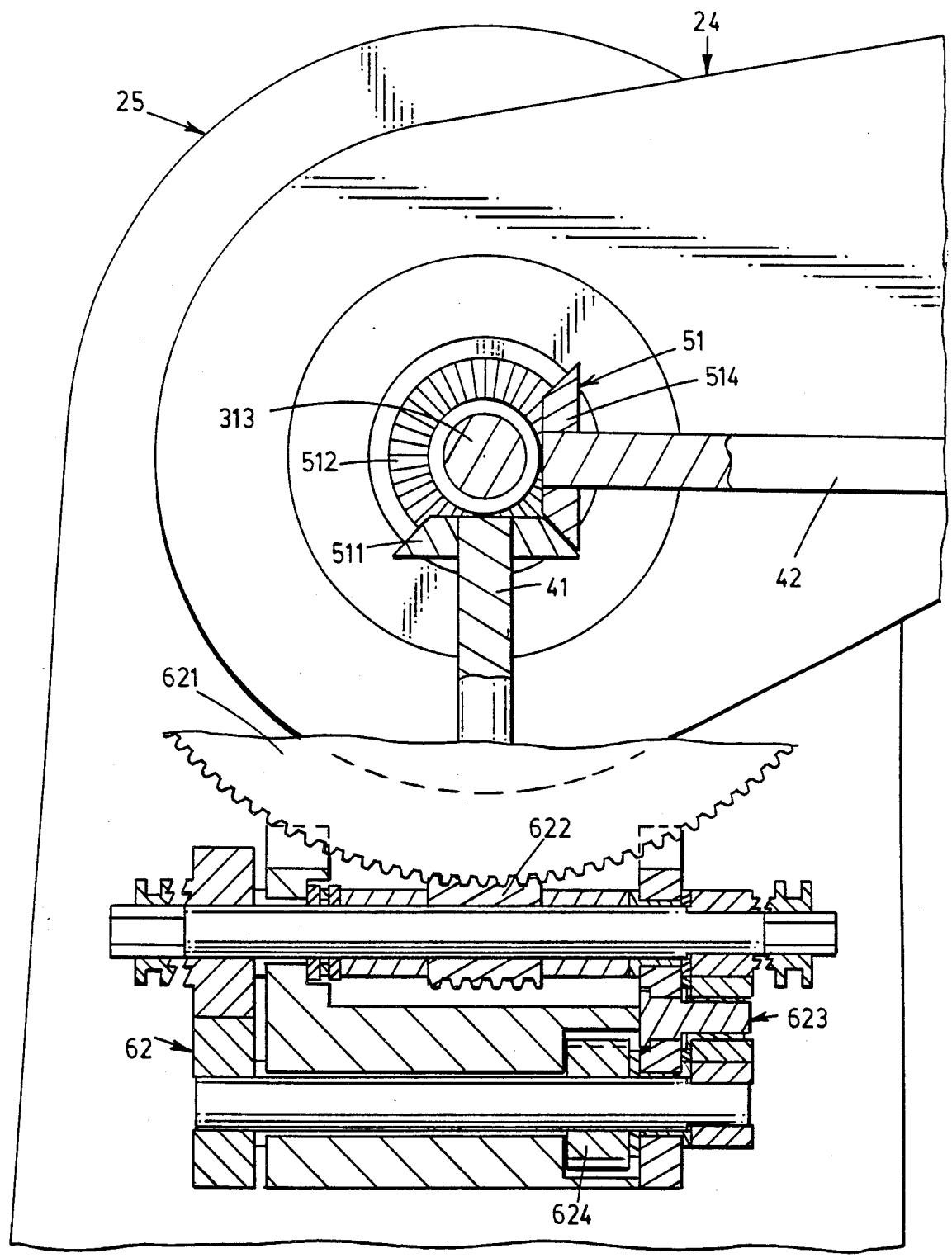
FIG. 6 is a cross-sectional view taken along line 6—6 in FIG. 5.

Referring to FIGS. 5 and 6, the shaft 41 extends to a driver gear 511 of the universal joint 51. The gear 511 is fixed on the shaft 41, and engages two idler gears 512, 513. The idler gears engage a driven gear 514, and drive the gear 514 in response to being driven by the driver gear 511. As shown in FIG. 6, the driven gear 514 is fixed on the shaft 42. The shaft 41 thereby drives the shaft 42.

Continuous engagement of the gears 511, 512, 513, 514 is assured by mounting of the gears 512, 513 along the axis of pivoting movement of the upper arm 24 relative to the shoulder 25.

As shown in FIG. 5, the upper arm 24 includes two laterally spaced upper arm members 241, 242. The members 241, 242 extend generally parallel to the shoulder members 251, 252. Member 241 is pivotally connected to member 251, while member 242 is pivotally connected to member 252.

At this shoulder-joined ends, each upper arm member 241, 242 is fastened to a first shoulder joint bearing support 311. At this upper arm-joined ends, each should member 251, 252 is fastened to a second shoulder joint bearing support 312. The supports 311, 312 are independent of each other. The supports 312 are bearing mounted on a shoulder joint shaft 313.

The shaft 313 extends between the members 251, 252 and into the supports 311, 312. The shaft 313 defines the pivot axis 314 of the shoulder. The supports 311 are fastened to the shaft 313 by retainers 315. Movement of the shaft 313 thereby drives the supports 311, members 241, 242 and the upper arm 24 in general.

The gears 512, 513 are mounted concentrically about the shaft 313 for independent motion from each other and from the shaft 313. Pivoting of the shaft 313 does not affect the operation of the universal joint 51.

Pivoting of the shaft 313 is controlled by the clutch mechanism 62. A driven gear 621 of the mechanism 62 is fixed on the shaft 313. As shown best in FIG. 6, the driven gear 621 is engaged by a driver gear 622. As with clutch mechanism 61, a gear train 623 including the gear 622 drives the gear 621. Intermittent power taken from the shaft 41 powers the joint 31.

With the shoulder connection now described, the elbow joint 32 is readily understood. Comparing FIGS. 9 and 10 to FIGS. 5 and 6, the elbow joint is structured and operates identically like the shoulder joint 31. The universal joint 52 is arranged and operates as does the universal joint 51. The clutch mechanism 63 is likewise constructed and operates identically like the clutch mechanism 62. Briefly, a gear train 633 and driven gear 631 drive a shaft 323 with power intermittently taken from a shaft 42. Two forearm members 231, 232 are fastened to and pivoted by the shaft 323 relative to the upper arm 24.

Progressing to FIG. 11, shafts 43, 44 are directly connected together for direct transmission of rotary motion of the shaft 43 to the shaft 44, through the roll joint 33. The forearm 22 is fixed to a joint support member 331, which is bearing mounted on the upper arm 23 to roll relative to the upper arm 23. The member 331 defines the roll axis 332 of the joint 33, and a central passage for the shafts 43, 44, which are centered on the axis 332.

The member 331 includes a driven gear 641, driven by a gear train 643 of the clutch mechanism 64. The mechanism 64 intermittently takes power from the shaft 43.

The shaft 44 terminates within the wrist 22 adjacent the hand 21, as shown in FIG. 12. The hand is fixed on a shaft 341 of the joint 34. A driven gear 651 on the shaft 341 is driven by the clutch mechanism 65.

Except for the clutch mechanisms 61-65, the robot 20 is now described within the limits of the invention. Hand 21 is not a part of the invention.

Figure 7:
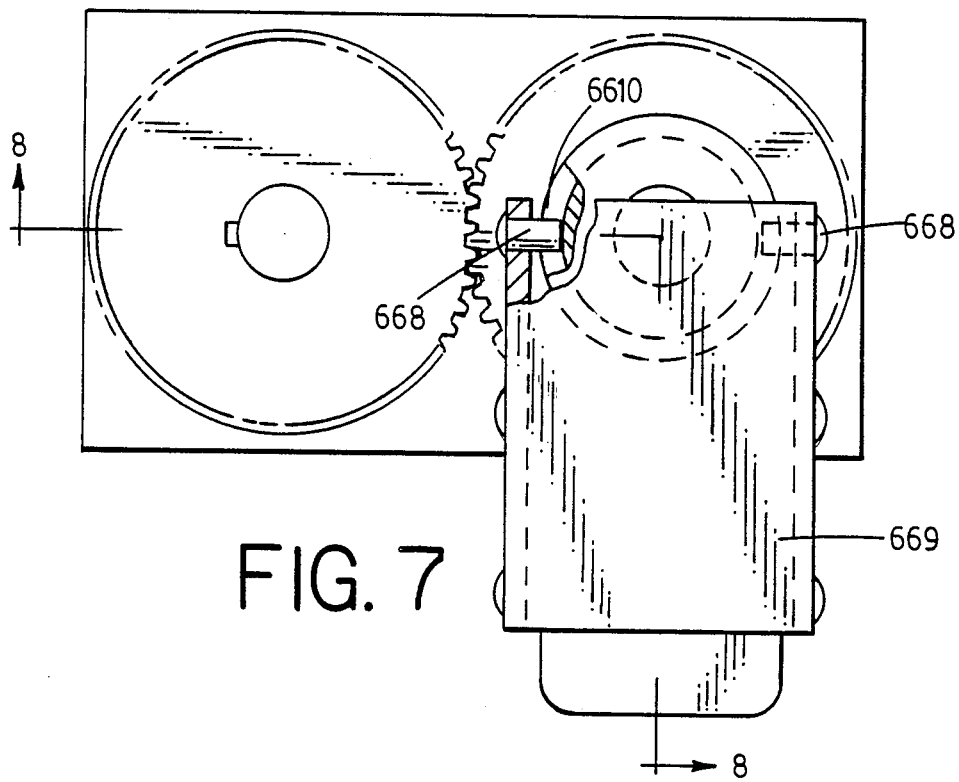
FIG. 7 is an elevation view of a representative clutch mechanism of the invention.
Figure 8:
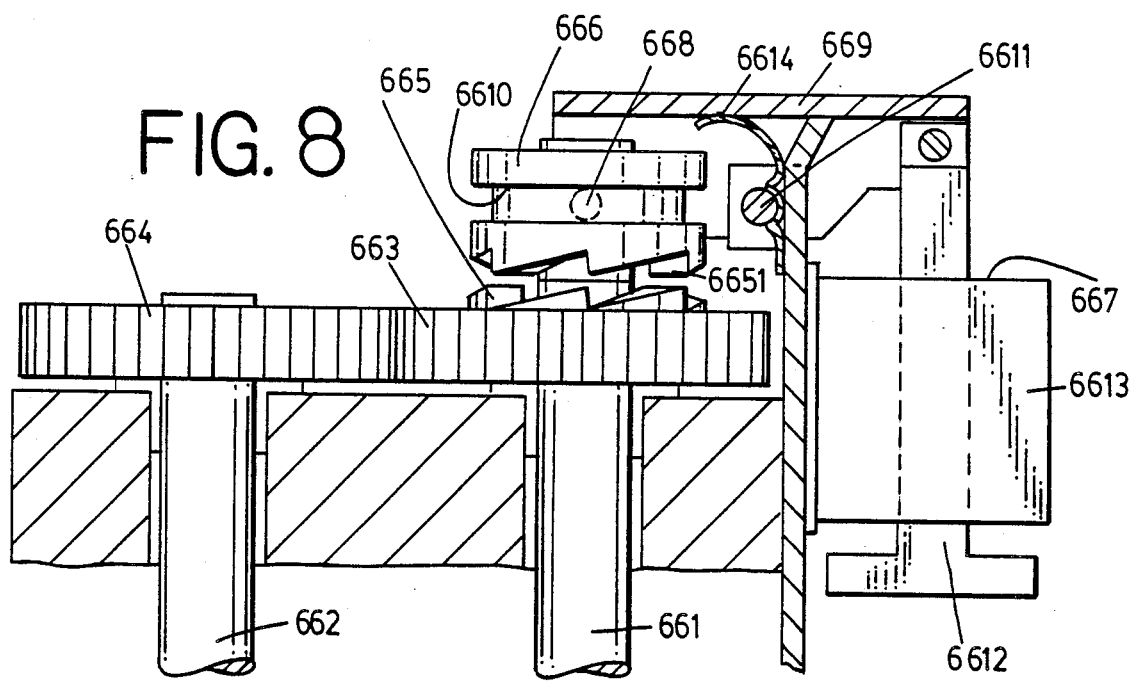
FIG. 8 is a cross-sectional view of a representative clutch mechanism of the preferred embodiment, taken along line 8—8 in FIG. 7.

Referring to FIGS. 7-8, the clutch mechanisms 61-65 are best described with an understanding of a simplified clutch mechanism 66. It should be understood that clutch mechanism 66 is illustrative, and not within the structure of the preferred robot 20. Attention is directed to the unusual course of line 8—8 along which the cross-section of FIG. 8 is taken. Line 8—8 forms a right angle in FIG. 7.

Mechanism 66 includes a first shaft 661 and a second shaft 662. The first shaft 661 is the driving shaft. Shaft 662 is a driven shaft. The driving shaft 661 is engaged by gears to a rotating shaft of a continuous shaft means, and is constantly rotating.

A clutch-spur gear 663 is fixed axially but not rotationally on the driving shaft 661. The gear 663 is normally free to rotate or remain at rest independent of the shaft 661. Only independent axial movement along the axis of shaft 661 is prohibited.

The gear 663 continuously engages a spur gear 664, and has end-facing teeth 665 adapted to engage with cooperating, end-facing teeth 665' of a clutch gear 666. The spur gear 664 is fixed both axially and rotationally on the shaft 662.

The clutch gear 666 is mounted on the shaft 661. The clutch gear 666 is fixed rotationally on the shaft 661, but is free axially of the shaft 661. In the non-engaging position shown, the gears 663, 666 do not engage.

The gear 666 is axially movable into engagement with the gear 663 under control of a clutch solenoid 667. Pins 668 on a clutch pivot lever 669 ride in a slot 6610 of the clutch gear 666. Axial movement of the pins 668 controls axial position of the gear 666.

Movement of the pins 668 is regulated by the lever 669 and in turn by the solenoid 667. The lever 669 is lever mounted on the pins 6611, for see-saw movement about these pins. A plunger 6612 of the solenoid 667 is pivotably attached to the lever 669, opposite the pins 668 from the pins 6611.

When a solenoid coil 6613 is energized, the coil draws the plunger 6612 upward. The lever 669 is rocked about the pins 6611, driving the pins 668 and the gear 666 downward. The gear 666 is driven to an engaging position with the gear 663.

As stated previously, the gear 666 is continuously rotating with the shaft 661. When engaged with the gear 663, the gear 666 drives the gears 663, 664 and the shaft 661.

De-energization of the solenoid coil 6613 releases the solenoid plunger 6612. A spring 6614 returns the lever to the position of FIG. 8, and the clutch gear 666 to the non-engaging position.

The gear teeth 665, 665' by which the gears 663, 666 engage are contoured in axial flats and angled sloped to assure rapid disengagement of the gears and an overload limit in the clutch mechanism 66. As a result, the mechanism 66 is adapted for driving shaft 662 in one direction of rotation only.

Clutch mechanism 66 can be modified to take a variety of more elaborate forms, and has been so modified to form clutch mechanisms 61-65. First, clutch mechanism 66 is adapted to drive in one direction only. Two sets of spur, clutch and clutch-spur gears, solenoids and associated hardware may be placed one set at each end of the driving and driven shafts of a more complex clutch mechanism. One set drives in one direction. The other, oppositely positioned set drives in the opposite direction. Clutch mechanisms 61-65 are so constructed.

Second, an additional gear or gears may be placed intermediate the gears 663, 664, as desired. Such gears are employed in mechanisms 61-65.

Third, such other gears as desired may be positioned elsewhere in the gear train of the clutch mechanism. The positions of such components as the lever 669 and solenoid 6613 may also be varied. As an example, gears such as 621, 662, 624 and 625 are employed in the clutch mechanism 62.

Fourth, and significantly, the shaft 661 can be made the driven shaft, with shaft 662 becoming the driving shaft. Gears 664, 663 then continuously rotate. The gear teeth 665, 665' between gears 663, 666 are reversed in direction of slope. Engagement of the gears 663, 666 drives the gear 666 and thereby the shaft 661. Clutch mechanisms 62, 63 employ this configuration.

With the robot arm 20 as described, a significant advance in robot technology is achieved. One prime mover is employed for all robot movements about all joints. Control level voltage electricity is all the electricity required along the arm, for the arm, and no hydraulic lines are required for the arm whatsoever. Precision computer control is possible by precise control and recognition of solenoid energization internals and the like. The clutch mechanisms provide high torque transmission with minimal size and expense. Load and work capacities are desirable.

The preferred embodiment of the invention is now described. This preferred embodiment constitutes the best mode contemplated by the inventor of carrying out the invention. The invention, and the manner and process of making and using it, have been described in full, clear, concise and exact terms to enable any person skilled in the art to make and use the same. Because the invention may be copied without the copying the precise details of the preferred embodiment, the following claims particularly point out and distinctly claim the subject matter which the inventor regards as his invention and wishes to protect.

What is claimed is:

1. An industrial robot comprising a fixed base, a prime mover located in the fixed base, a plurality of mechanical links including pivot connections pivotably connected to each other in series, one of the mechanical links pivotably connected to the base, and a means for driving the mechanical links relative to each other and to the base, the driving means supported by the mechanical links and including a common mechanical, power transmitting means extending along one path through the plurality of links for transmitting power from the prime mover through the links and a plurality of selectively operating power take off means each located on a link adjacent a pivot connection, each for selectively taking power from the same power transmitting means, and each for driving one of the mechanical links relative to another mechanical link about an adjacent pivot connection, the power transmitting means continuously transmitting power along the one path through the plurality of links, whereby the mechanical links are driven by the same prime mover and by the same power transmitting means.

2. An industrial robot as in claim 1 in which the power transmitting means includes a plurality of shafts extending along the mechanical links in a single series, the power take off means each taking power from a shaft among the plurality of shafts in the single series.

3. An industrial robot as in claim 2 in which the power transmitting means further comprises univeral joints joining the plurality of shafts to each other in series.

4. An industrial robot as in claim 3 in which the universal joints are aligned with the axes of the pivot connections of the mechanical links.

5. An industrial robot as in claim 1 in which the power take off means comprises a plurality of clutch mechanisms each located on a link adjacent a pivot connection and being for driving a link about the pivot connection to which the clutch mechanism is adjacent.

6. An industrial robot comprising:
   a base;

a shoulder mounted on the base with a waist joint therebetween;

an arm mounted on the shoulder with a shoulder joint therebetween;

a first shaft extending from the base through the waist joint into the shoulder and to the shoulder joint, the shaft rotatably mounted on the robot;

a second shaft extending from the shoulder joint into the arm, the second shaft rotatably mounted on the robot;

means for transmitting rotation of the first shaft to the second shaft in a variety of positions of the arm relative to the shoulder and connecting the first shaft to the second shaft;

first power take off means for selectively taking power from the first shaft and driving the shoulder about the waist joint relative to the base, the first means mounted on the robot adjacent the waist joint; and second power take off means for selectively taking power from the first shaft and driving the arm about the shoulder joint relative to the shoulder, the second means mounted on the robot adjacent the shoulder joint, the first shaft and the second shaft being continuously rotatable and rotating and providing one path through the shoulder and arm for continuously transmitting power through the shoulder and arm.

7. An industrial robot as in claim 6 in which the shoulder joint includes a shoulder joint shaft, the arm being fixed to the shoulder joint shaft, the shoulder joint shaft being pivotably mounted on the shoulder and the arm being pivotable with the shoulder joint shaft relative to the shoulder, the first means being means for selectively driving the shoulder joint shaft and thereby the arm.

8. An industrial robot as in claim 7 in which the first means comprises a driven gear fixed on a platform which is fixed to the shoulder, and a gear train including an electro-mechanical clutch mechanism, the gear train operatively connected to the first shaft and selectively driving the driven gear.

9. An industrial robot as in claim 8 in which the gear train includes a gear fixed on the first shaft and continuously driven by the first shaft.

10. An industrial robot as in claim 6 in which the arm is an upper arm, the robot further comprising:

a forearm mounted on the upper arm with an elbow joint therebetween, the second shaft extending to the elbow joint;

a third shaft extending from the elbow joint into the forearm, the third shaft rotatably mounted on the robot;

means for transmitting rotation to the third shaft from the second shaft in a variety of positions of the forearm relative to the upper arm; and third power take off means for selectively taking power from the third shaft and driving the forearm about the elbow joint relative to the upper arm;

the first shaft, second shaft and third shaft being continuously rotatable and rotating and providing one path through the shoulder, upper arm and forearm for continuously transmitting power through the shoulder, upper arm and forearm.

11. An industrial robot as in claim 10 further comprising:

a wrist mounted on the forearm with a wrist roll joint therebetween; and means for selectively taking power from the third shaft and driving the wrist relative to the forearm about the wrist roll joint and being mounted on the robot adjacent the wrist roll joint.

12. An industrial robot as in claim 11 further comprising:

a hand mounted on the wrist with a wrist pivot joint therebetween; and means for selectively taking power from the third shaft and driving the hand relative to the wrist about the wrist pivot joint and being mounted on the robot adjacent the wrist pivot joint.

13. An industrial robot as in claim 6 in which the means for transmitting rotation comprises a universal joint joining the second shaft to the first shaft in series.

14. An industrial robot as in claim 13 in which the universal joint is aligned with the shoulder joint.

15. An industrial robot as in claim 6 in which the first and the second means for selectively taking power comprise clutch mechanisms.

16. An industrial robot as in claim 15 in which each clutch mechanism comprises:

a clutch shaft;

a first gear axially fixed along the clutch shaft and rotationally movable relative thereto;

a second gear rotationally fixed on the clutch shaft and axially movable relative thereto, the second gear adapted to engage the first gear; and means for selectively moving the second gear axially along the clutch shaft to engage the first gear, upon command.

17. An industrial robot as in claim 16 in which the means for selectively moving the second gear comprises a solenoid-actuated lever operatively connected to the second gear.

18. An industrial robot comprising:

a base;

a shoulder mounted on the base;

an upper arm mounted on the shoulder with a shoulder joint therebetween;

a forearm mounted on the upper arm with an elbow joint therebetween;

a first shaft extending in the shoulder and to the shoulder joint, the first shaft rotatably mounted on the robot;

a second shaft extending from the shoulder joint into the upper arm and to the elbow joint, the second shaft rotatably mounted on the robot;

a third shaft extending from the elbow joint into the forearm, the third shaft rotatably mounted on the robot;

first means for transmitting rotation of the first shaft to the second shaft in a variety of positions of the upper arm relative to the shoulder and connecting the first shaft to the second shaft;

second means for transmitting rotation of the second shaft to the third shaft in a variety of positions of the forearm relative to the upper arm and connecting the second shaft to the third shaft;

first power take off means for selectively taking power from the first shaft and driving the upper arm about the shoulder joint relative to the shoulder, the first power take off means mounted on the robot adjacent the shoulder joint; and second power take off means for selectively taking power from the second shaft and driving the forearm about the elbow joint relative to the upper arm, the second power take off means mounted on the robot adjacent the elbow joint;

the first, second and third shafts being continuously rotatable and rotating and providing one path through the shoulder, upper arm and forearm for continuously transmitting power through the shoulder, upper arm and forearm.

19. An industrial robot as in claim 18 further comprising:
   a wrist mounted on the forearm with a wrist roll joint therebetween; and
   third means for selectively taking power from the third shaft and driving the wrist relative to the forearm about the wrist roll joint and being mounted on the robot adjacent the wrist roll joint.

20. An industrial robot as in claim 19 further comprising:
   a hand mounted on the wrist with a wrist pivot joint therebetween and the third shaft extending through the forearm into the wrist; and
   forth means for selectively taking power from the third shaft and driving the hand relative to the wrist about the wrist pivot joint and being mounted on the robot adjacent the wrist pivot joint.

21. An industrial robot as in claim 18 in which both the first and the second means for transmitting rotation comprise universal joints joining all the shafts in series.

22. An industrial robot as in claim 21 in which the universal joints are aligned with the shoulder and elbow joints.

23. An industrial robot as in claim 18 in which both the first and the second means for selectively taking power comprise clutch mechanisms.

24. An industrial robot as in claim 23 in which each clutch mechanism comprises:
   a clutch shaft;
   a first gear axially fixed along the clutch shaft and rotationally movable relative thereto;
   a second gear rotationally fixed on the clutch shaft and axially movable relative thereto, the second gear adapted to engage the first gear; and
   means for selectively moving the second gear axially along the clutch shaft to engage the first gear, upon command.

25. An industrial robot as in claim 24 in which the means for selectively moving the second gear comprises a solenoid-actuated lever operatively connected to the second gear.

26. An industrial robot comprising a plurality of mechanical links including pivot connections pivotably connected to each other and a single means for driving the mechanical links relative to each other including a single prime mover and a single mechanical, power transmitting means for transmitting power to all the links from the single prime mover along the links in a single path of power and a plurality of selectively operating, mechanical, power take off means each located adjacent a pivot connection, all for selectively taking power from the same single power transmitting means from along the same single path of power and each for driving one of the mechanical links relative to another mechanical link, the single mechanical, power transmitting means continuously transmitting power through the plurality of the links.

* * * * *